(12) United States Patent
Goto

(10) Patent No.: US 6,325,039 B1
(45) Date of Patent: Dec. 4, 2001

(54) COMBINED ENGINE AND METHOD FOR OPERATING THE SAME

(75) Inventor: Satoru Goto, Tokyo (JP)

(73) Assignee: Niigata Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/307,908

(22) Filed: May 11, 1999

(30) Foreign Application Priority Data

May 13, 1998 (JP) .................................................. 10-130849

(51) Int. Cl.$^7$ ...................................................... F02B 19/10
(52) U.S. Cl. ...................... 123/275; 123/256; 123/27 GE
(58) Field of Search ................................... 123/256, 260, 123/261, 267, 275, 27 GE, 526

(56) References Cited

U.S. PATENT DOCUMENTS

| | | | |
|---|---|---|---|
| 4,091,772 | * 5/1978 | Heater et al. | 123/275 |
| 4,765,293 | 8/1988 | Gonzalez | 123/275 |
| 5,060,610 | 10/1991 | Paro | 123/300 |
| 5,222,993 | 6/1993 | Crane | 123/256 |
| 5,887,566 | * 3/1999 | Glauber et al. | 123/275 |
| 6,095,112 | * 8/2000 | Glauber et al. | 123/275 |

FOREIGN PATENT DOCUMENTS

| | | |
|---|---|---|
| 28 51 504 | 6/1980 | (DE) . |
| 40 42 325 A1 | 5/1991 | (DE) . |
| 196 21 297 C1 | 12/1997 | (DE) . |
| 197 41 566 A1 | 3/1999 | (DE) . |

* cited by examiner

Primary Examiner—Andrew M. Dolinar
(74) Attorney, Agent, or Firm—Fish & Richardson P.C.

(57) ABSTRACT

The present invention relates to a combined engine which receives a drive output by means of supplying and combusting at least one fuel selected from among a gas fuel and a liquid fuel. The engine according to the present invention comprises: a main combustion chamber (1) which comprises a piston (3), a cylinder (2) and a cylinder head (4); a precombustion chamber (10) equipped with a spark plug, which serves as an ignition source for a fuel-air mixture comprising air and gas fuel within the main combustion chamber; and a liquid fuel injection valve (30) for injecting liquid fuel into the main combustion chamber; wherein, the precombustion chamber and liquid fuel injection valve are provided in the cylinder head.

5 Claims, 10 Drawing Sheets

IV : INTAKE VALVE
IGV : INTAKE GAS VALVE
EV : EXHAUST VALVE

| NUMBERS | 1 PLUG | 2 PLUGS |
|---|---|---|
| SPARK PLUG A | ○ | ○ |
| SPARK PLUG B | × | ○ |

COMBINED ENGINE AND METHOD FOR OPERATING THE SAME

BACKGROUND OF THE INVENTION

1. Field of the Invention

The present invention relates to a combined engine which is capable of utilizing either gas fuel or liquid fuel by means of selecting the appropriate operational mode, and which is applied mainly towards generating electricity. This application is based on an patent application No. Hei 10-130849 filed in Japan, the content of which is incorporated herein by reference.

2. Relevant Art

In recent years, gas engines have continued to enjoy wide usage as the key hard of co-generation system. In particular, in commercial district, due to the regulation of exhaust gas, spark-ignition gas engines with a precombustion chamber are being widely employed. On the other hand, diesel engines are also in great demand for use in fire prevention and power maintenance during times of emergency.

Conventionally, the gas and diesel engines for satisfying the aforementioned demands had to be designed separately, as different engine types, since an engine capable of providing both spark ignition and compression ignition in the same engine did not exist. Consequently, a great demand exists for the preparation of a gas engine for use during normal operation, and a diesel engine for use in emergency operation, with large amounts of capital being invested accordingly.

On the other hand, a combined engine exists that is capable of operating in both a gas operational mode in which gas fuel is used, and a diesel operational mode in which liquid fuel is used. According to this type of combined engine, it is possible to selectively switch between a gas operational mode, in which gas fuel is combusted using a small amount of pilot oil (approximately 5~15% of the entire fuel amount) as the ignition source, and a diesel operational mode, in which only liquid fuel is combusted. With regard to this engine, at the time of starting the engine, the engine is started and warmed-up by means of liquid fuel which possesses a superior ignitability. After the engine is warmed-up, at the stage where the engine operational load factor reaches at least 30%, by switching from liquid fuel to gas fuel, the highly ignitable liquid fuel that is used as the pilot fuel is supplemented by ignition of the less ignitable gas fuel.

However, according to the conventional combined engines, due to the use of liquid fuel as the pilot fuel, in an amount of approximately 5~15% of the entire heating amount, there exists a limit with regard to the NOx, as well as the fall in soot and dust.

In consideration of the aforementioned, it is an object of the present invention is to provide a combined engine and method for operating the same which is capable of utilizing either gas fuel or liquid fuel, while also reducing the equipment costs and decreasing the amount of pollution therefrom.

SUMMARY OF THE INVENTION

Accordingly, the present invention provides a combined engine which receives a drive output by means of supplying and combusting at least one fuel selected from among a gas fuel and a liquid fuel, said engine comprising: a main combustion chamber which comprises a piston, a cylinder and a cylinder head; a precombustion chamber equipped with a spark plug which serves as an ignition source for a fuel-air mixture comprising air and the gas fuel within the main combustion chamber; and a liquid fuel injection valve for injecting liquid fuel into the main combustion chamber; wherein, the precombustion chamber and the liquid fuel injection valve are provided in the cylinder head.

In addition, according to the present invention, a method for operating a combined engine, as a spark ignition gas engine, is provided which comprises the steps of: supplying a fuel-air mixture comprising gas fuel and air to the main combustion chamber; supplying a pilot gas to the spark plug-equipped precombustion chamber, and spark igniting the pilot gas by means of the spark plug; and combusting the fuel-air mixture within the main combustion chamber using the spark plug-equipped precombustion chamber as an ignition source.

In addition, according to the present invention, a method for operating a combined engine, as a diesel engine, is provided which comprises the steps of: injecting, from a predetermined distance, a liquid fuel from the liquid fuel injection valve into the main combustion chamber; and compression-igniting the liquid fuel injected into the main combustion chamber.

In addition, according to the present invention, a method for operating a combined engine, as a pilot injection gas engine, is provided which comprises the steps of: supplying a fuel-air mixture comprising gas fuel and air to the main combustion chamber; injecting a small amount of liquid fuel from the liquid fuel injection valve into the main combustion chamber; compression-igniting the liquid fuel injected into the main combustion chamber; and combusting the fuel-air mixture within the main combustion chamber using the compression-ignited portion as an ignition source.

In addition, according to the present invention, a method for operating a combined engine, as a hybrid ignition gas engine that is capable of utilizing both gas fuel and liquid fuel, is provided which comprises the steps of: in the same combustion cycle, supplying a fuel-air mixture comprising gas fuel and air to the main combustion chamber; supplying a pilot gas to the spark plug-equipped precombustion chamber, and spark igniting the pilot gas by means of the spark plug; injecting a small amount of liquid fuel from the liquid fuel injection valve and compression-igniting the liquid fuel at approximately the same timing, or alternatively before or after the spark-ignition; and combusting the fuel-air mixture within the main combustion chamber using the spark-ignited and compression-ignited portions as ignition sources.

Furthermore, according to the present invention, a method for operating a combined engine is provided which comprises the steps of: during times of normal operation, supplying a fuel-air mixture comprising gas fuel and air to the main combustion chamber; supplying a pilot gas to the spark plug-equipped precombustion chamber, and spark igniting the pilot gas by means of the spark plug; combusting the fuel-air mixture within the main combustion chamber using the spark plug-equipped precombustion chamber as an ignition source; wherein, at the time when an ignition abnormality of the spark plug-equipped precombustion chamber is detected due to a change in the exhaust temperature, another operational process is performed which differs from that performed in the operational mode during times of normal operation.

DETAILED DESCRIPTION OF THE PREFERRED EMBODIMENTS

In the following, the embodiments of the present invention will be explained in detail with reference to the figures.

Figure 1:
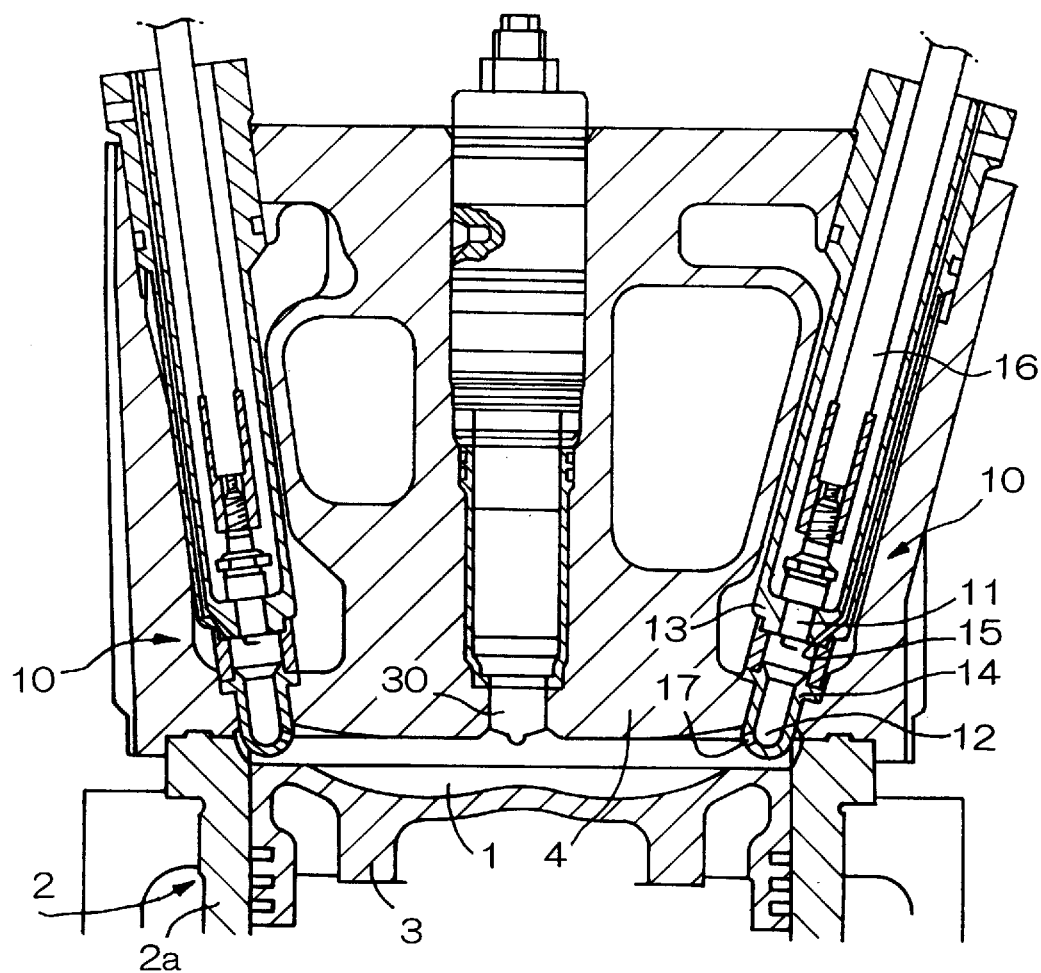
FIG. 1 is a diagram showing a cross-sectional side view of the essential components of a combined engine according to an embodiment of the present invention.

FIG. 1 is a cross-sectional side view showing the cylinder head portion of a combined engine according to an embodiment of the present invention. In the figure, a cylinder 2, cylinder liner 2a, piston 3, cylinder head 4, and main combustion chamber 1 are provided. The main combustion chamber 1 is surrounded by the piston 3, cylinder liner 2a and cylinder head 4. A liquid fuel injection valve 30 for use in diesel operation is formed in the center of the cylinder head 4, and one precombustion chamber 10 equipped with a spark plug is provided on each side of the cylinder head 4.

The precombustion chamber unit 10 equipped with a spark plug (hereinafter referred to as simply "spark plug-equipped precombustion chamber") is constructed by combining a precombustion chamber body 14 and a precombustion chamber foundation 13. A gas fuel (pilot gas) is directly supplied to the precombustion chamber 12 housed within the precombustion chamber body 14 via fuel injection port 15. The main combustion chamber 1 and precombustion chamber 12 communicate via a plurality of connection ports 17, which are provided on the lower end of the precombustion chamber 12 as a jet nozzle. In addition, the precombustion chamber foundation 13 is equipped with a spark plug 11 which serves as an ignition source for the fuel-air mixture within precombustion chamber 12. Furthermore, in order to suppress the NOx of the exhaust gas to an extremely low level, the volume ratio (ratio of the entire combustion chamber volume at the top dead point during compression) of the precombustion chamber 12 must be controlled at approximately a few percent.

Figure 2:
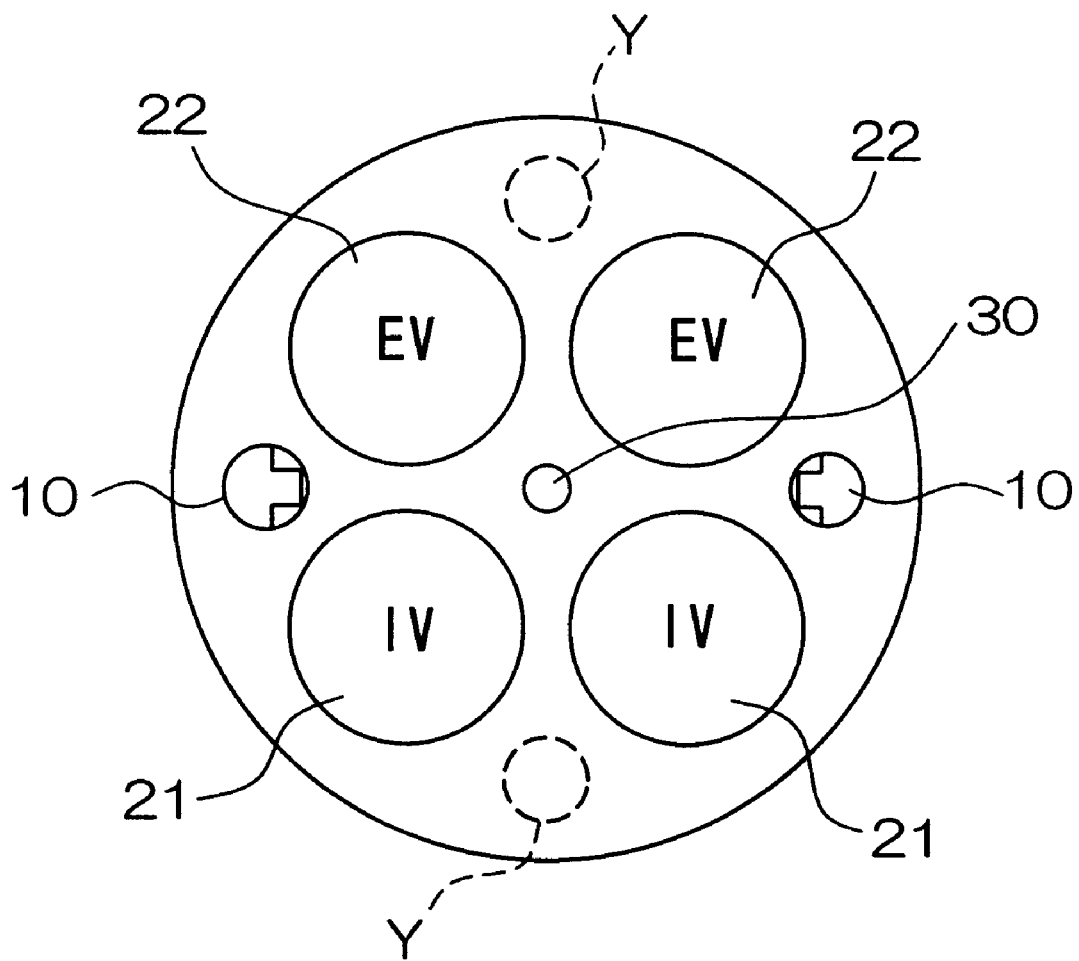
FIG. 2 is a plane view diagram showing the arrangement of a spark plug-equipped precombustion chamber in relation to the main combustion chamber in the aforementioned engine according to the present invention.

The positions of the spark plug-equipped precombustion chamber units 10 and each of the valves are shown in FIG. 2. In the cylinder head, with respect to the circular cross-section of the main combustion chamber, two inlet valves 21 are positioned on one half of the cylinder head and two exhaust valves 22 are positioned on the remaining half, with the spark plug-equipped precombustion chamber units 10 being arranged towards the periphery at the area where the two valves respectively housing the inlet valves 21 and exhaust valves 22 interface. Furthermore, the spark plug-equipped precombustion chamber units 10 may also be respectively positioned between the two inlet valves 21, and between the two exhaust valves 22 (indicated by the position Y in FIG. 2).

Figure 3:
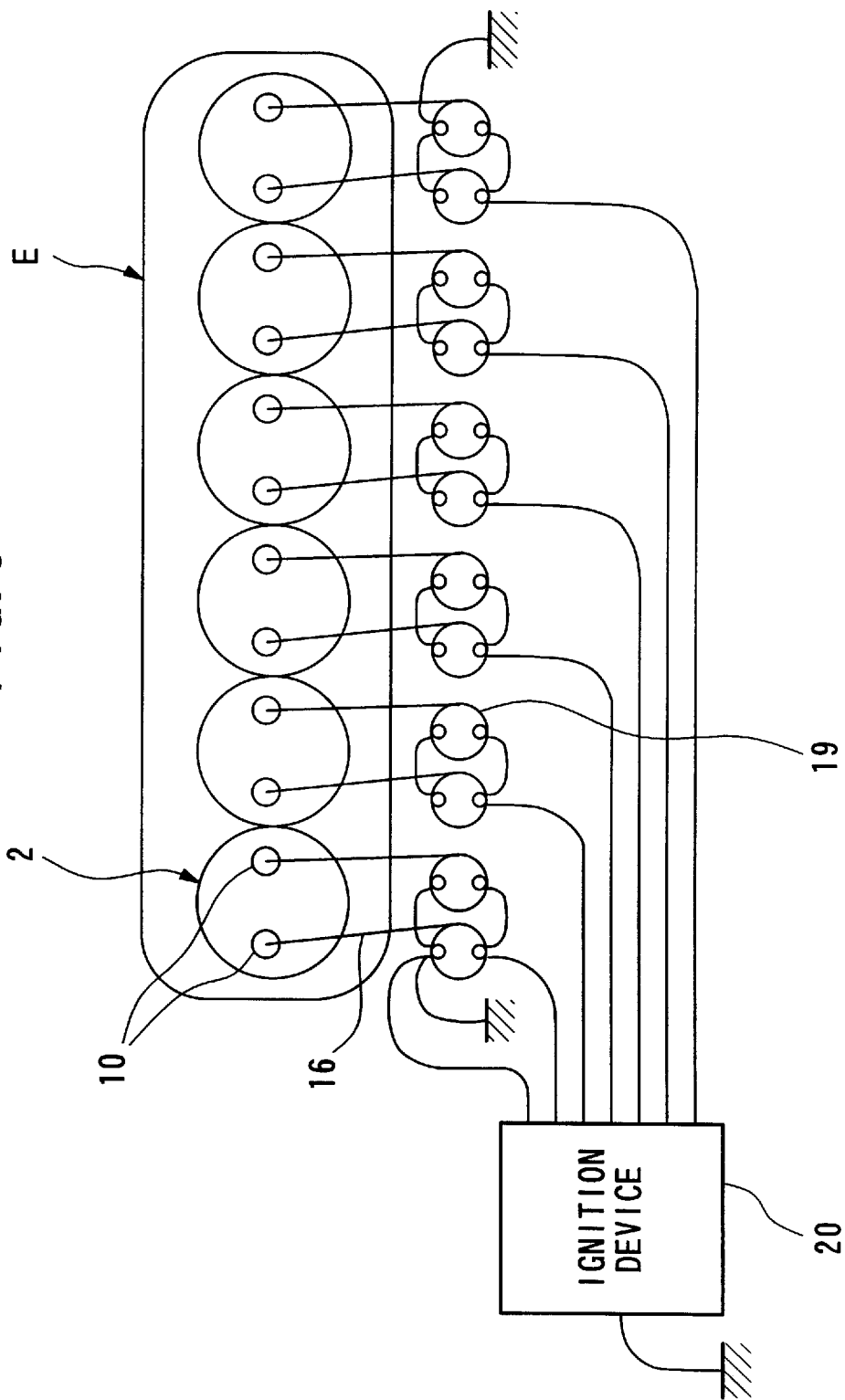
FIG. 3 is a plane view diagram showing an outline of the wiring system in the aforementioned engine according to the present invention.

The entire structure of the present engine E is shown in FIG. 3. This engine E is a serial 6-cylinder engine equipped with the aforementioned spark plug-equipped precombustion chamber units 10 and liquid fuel injection valve (not shown in the figure). In FIG. 3, a high pressure cable 16 is provided, by means of which the spark plugs of each spark plug-equipped precombustion chamber unit 10 is connected to an ignition coil 19. In addition, an ignition device 20 is also provided in the engine.

In the following, each of the various operational modes that the aforementioned combined engine is capable of executing will be explained.

There are four possible operational modes:

(A) An operational mode for the spark ignition gas engine;

(B) An operational mode for the diesel engine;

(C) An operational mode for the pilot injection gas engine;

(D) An operational mode for the hybrid ignition gas engine.

In each operational mode, use of the spark plug-equipped precombustion chamber and fuel injection valve, as well as the type of main fuel is described below.

| Mode | Spark plug-equipped precombustion chamber | Fuel injection valve | Main fuel |
| --- | --- | --- | --- |
| (A) | Used | Not used | Gas |
| (B) | Not used | Used | Liquid |
| (C) | Not used | Used | Gas |
| (D) | Used | Used | Gas |

(1) Operational Mode for use as a Spark-Ignition Gas Engine

According to this operational mode, only gas fuel (gas) is used as the fuel and the spark plug-equipped precombustion chamber is employed as the ignition source for the fuel-air mixture comprising air and the gas fuel within the main combustion chamber.

More concretely, from the second-half of the exhaust process to the first-half of the intake process, a pilot gas is supplied from the fuel injection port 15 of the spark plug-equipped precombustion chamber unit 10 (hereafter, the numerals are in reference to FIG. 1) to precombustion chamber 12. This pilot gas is supplied by means of the pressure difference between the pressure in the pilot gas header (not shown in the figures) and the pressure within main combustion chamber 1; the amount of the pilot gas is adjusted by means of changing the aforementioned pressure difference.

Additionally, during the intake process, the lean mixture comprising the fuel gas and air is supplied to the main combustion chamber 1. This lean mixture within the main combustion chamber 1 is compressed in the compression stroke by means of piston 3. As a result, a portion of the lean mixture flows into precombustion chamber 12 via connection port 17. At this time, the fuel gas within precombustion chamber 12 and lean mixture are mixed, such that the average excess air ratio reaches approximately 1.0. At this point, a spark discharge is generated in the gap between spark plugs 11, and the fuel-air mixture within precombustion chamber 12 is spark-ignited. The flame combusted in precombustion chamber 12 is then propagated to the main combustion chamber 1 through connection port 17, thereby forming the ignition source for the fuel-air mixture in the main combustion chamber 1. As a result, all of the fuel-air mixture within the main combustion chamber 1 is combusted.

The effects obtained when operating in the spark-ignition gas engine mode which utilizing the precombustion chamber are supplemented. The NOx and thermal efficiency, in an engine having a cylinder bore of 335 mm and a stroke of 360 mm, were respectively compared in the case of providing either one or two spark plug-equipped precombustion chambers. In the case of providing a single precombustion chamber equipped with spark plugs, the spark plug-equipped precombustion chamber was formed in the center of the cylinder head.

Figure 4:
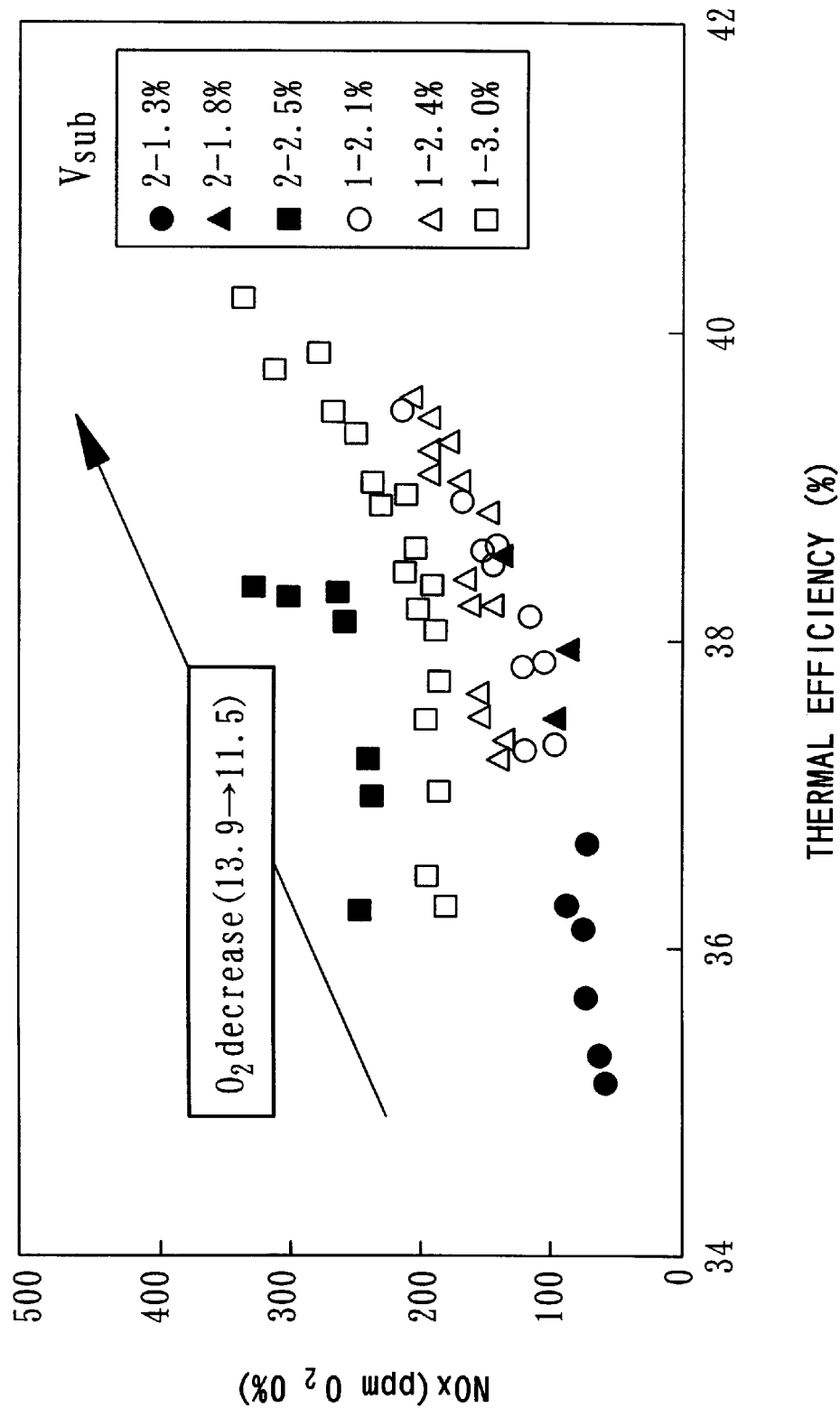
FIG. 4 is characteristic diagram for explaining the performance of the combined engine according to the present invention, and shows the relationship between the brake thermal efficiency and NOx concentration.

The relationship between the brake thermal efficiency and NOx is shown in FIG. 4. In FIG. 4, ○, Δ, and □ represent the respective data in the case when the volume ratio of a single spark plug-equipped precombustion chamber was 2.1%, 2.4% and 3.0%, respectively. In addition, ●, ▲, and ■ represent the respective data in the case when the volume ratio of a plurality of spark plug-equipped precombustion chambers was 1.3%, 1.8% and 2.5%, respectively. In the present experiment, the performance of the engine was measured during operation while varying the residual oxygen concentration of the exhaust gas over 11.5~13.9%, with a BMEP (brake mean effective pressure) of 1.23 MPa, an engine speed of 750 rpm, an ignition timing BTDC (before the top dead center) of 18° and 20°, and a supply air temperature tb (charge air temperature) of 65° C.

There is an overall tendency for the brake thermal efficiency to improve and the NOx to rise as the oxygen concentration is lowered. In addition, when comparing the NOx at a brake thermal efficiency of 38% in the case of a single spark plug-equipped precombustion chamber, the NOx increased respectively from 110 ppm to 160 ppm to 200 ppm as the precombustion chamber volume ratio was increased from 2.1% to 2.4% to 3.0% (as indicated by ○, Δ, and □ in FIG. 4). On the other hand, in the case of providing a plurality of precombustion chambers (e.g., 2), it was possible to lower the NOx by optimizing the volume ratio of the precombustion chambers. For example, the NOx level in the case of a volume percentage of 1.3% (● in FIG. 4) was no greater than 100 ppm, which was much lower than in the case of a single precombustion chamber.

Figure 5:
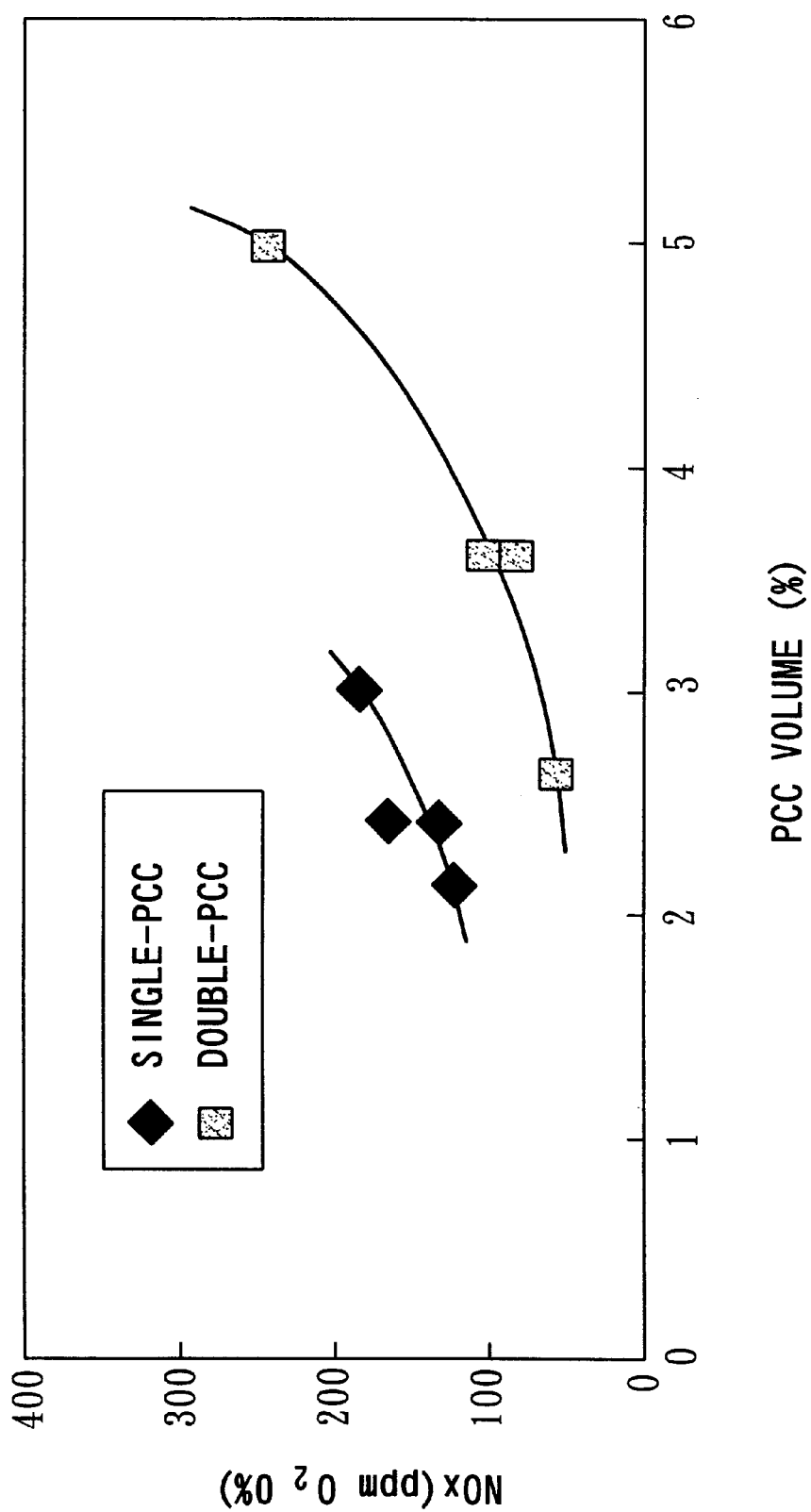
FIG. 5 is characteristic diagram for explaining the performance of the combined engine according to the present invention, and shows the relationship between the precombustion chamber volume percentage and NOx concentration.

FIG. 5 shows the relationship between the respective volume ratio (the sum total of the respective volume ratio is shown in the case of a plurality of precombustion chambers) and NOx when a single precombustion chamber (single-PCC) and two precombustion chambers (double-PCC) were respectively provided. The NOx concentration was read out from FIG. 4 using the values at the time of a thermal efficiency of 36~37%. As seen in FIG. 5, the NOx level was lower in the case when two precombustion chambers were used. This signifies that even when using the same ignition energy, distributing the positions for imparting ignition energy by means of providing a plurality of precombustion chambers was effective in lowering the NOx level. As a result of the aforementioned, it is possible to achieve a drastic reduction in the NOx level by positioning a small precombustion chamber (volume ratio of approximately 1~3%) on each side of the engine, as in the combined engine of the present invention, and operating in the spark-ignition gas engine mode.

(2) Operational Mode for use as a Diesel Engine

According to this operational mode, only liquid fuel is used as fuel, wherein a small amount of liquid fuel is injected into the main combustion chamber 1 from a centrally positioned liquid fuel injection valve 30, in response to the engine operational load, without using the spark plug-equipped precombustion chambers provided on each side thereof.

(3) Operational Mode for use as a Pilot Injection Gas Engine

According to this operational mode, gas is used as the main fuel and a small amount of liquid fuel is used as an auxiliary fuel, wherein fuel-air mixture within the main combustion chamber 1 is combusted by means of injecting a small amount (i.e., approximately 5~15% of the entire quantity of heat) of the liquid fuel from a central liquid fuel injection valve 30, and using this injected liquid fuel as the ignition source. Consequently, this operational mode utilizes the combined engine as a gas engine without using the spark plug-equipped precombustion chambers.

(4) Operational mode for use as a Hybrid Ignition Gas Engine

According to this operational mode, in the same combustion cycle, a fuel-air mixture comprising air and gas fuel is supplied to the main combustion chamber 1, and a pilot gas is supplied to the precombustion chamber 12 of the spark plug-equipped precombustion chamber unit 10 and spark ignited by means of spark plug 11, at approximately the same timing or alternatively before or after this spark ignition, a small amount of liquid fuel is injected from a central liquid fuel injection valve 30, and compression-ignited. The fuel-air mixture in the main combustion chamber 1 is then combusted using the aforementioned spark-ignited and compression-ignited portions as the ignition sources. In this manner, it is possible to promote combustion of the fuel-air mixture using multipoint ignition (e.g., three points in this example). Furthermore, by means of optimally adjusting (1) the spark ignition period of these ignition sources, (2) the period of pilot fuel injection, and (3) the injection amount, it is possible to improve the combustibility of the fuel-air mixture and also improve the thermal efficiency secondary to shortening the combustion period.

The effects of shortening the combustion period by means of multipoint ignition in the case of operating in the hybrid ignition gas engine mode are also supplemented.

Figure 6A:
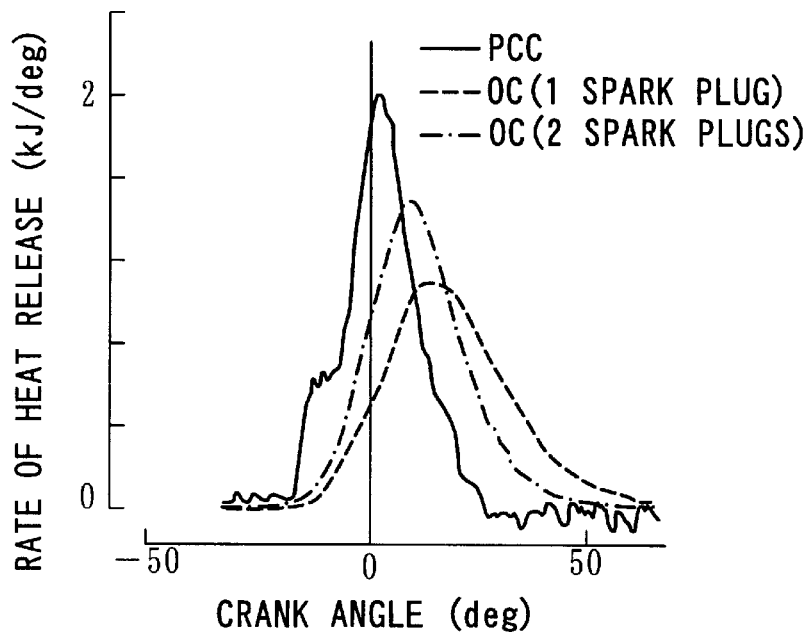
FIG. 6A is comparative diagram for explaining the performance of the combined engine according to the present invention, and shows the respective rate of heat release from a single combustion chamber method and from a precombustion chamber method.
Figure 6B:
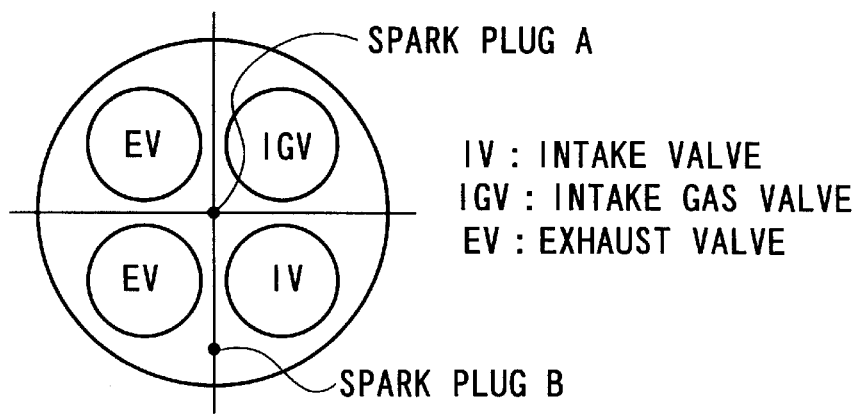
FIG. 6B is a plane view diagram showing the positions of the spark plugs in the combined engine described in FIG. 6A.

FIG. 6A is a diagram showing the experimental results obtained when comparing the rate of heat release from a single combustion chamber method (method involving only a main combustion chamber without a precombustion chamber) and a precombustion chamber method (i.e., as in the case of the present example). In FIG. 6A, both a precombustion chamber method PCC, and single combustion chamber method OC are shown. In the case of an OC, a further comparison is made comparing the case of one spark plug (OC (1 spark plug)) and two spark plugs (OC (2 spark plugs)). At the time of the experiment, first and second spark plugs A, B were respectively positioned centrally and to the side, as shown in FIG. 6B. In the case of a single spark plug, only the central spark plug A was used, while in the case of two spark plugs, both spark plugs A and B were employed.

The patterns of the rate of heat release shown in FIG. 6A indicate that the multipoint ignition (i.e., in the case of 2 spark plugs) as well as the energy generated from a strong ignition (i.e., in the case of using a precombustion chamber PCC as the ignition source) are effective in achieving a rapid combustion. In other words, when two spark plugs are employed (represented by the alternating long-short dashed lines in the figure) after the top dead center, the heat release is completed by the time the crank angle nears 40°, which represents a shorter combustion period when compared to that obtained with a single spark plug (represented by the dashed line in the figure). In addition, according to a precombustion chamber method (represented by the continuous line in the figure) possessing an even stronger ignition energy, the heat release is completed by the time the crank angle nears 30° after the top dead center, which represents an even shorter combustion period. Consequently, as seen from the present embodiment, it is possible to achieve a rapid combustion by means of arranging multiple ignition sources (e.g., arranging two precombustion chambers) possessing a strong ignition energy. In addition, a shorter combustion period contributes to an improvement of the thermal efficiency, and thus the thermal efficiency is also improved.

Incidentally, when comparing the ignition energies, in the case of using only spark plugs, approximately 0.1 J are generated; however, in the case of the pilot injection, when the oil in the pilot fuel is 1% of the entire quantity of heat, the energy generated is approximately 600 J. This indicates that the multipoint ignition produced by the spark plug-equipped precombustion chambers 10 and pilot fuel injection valve-equipped precombustion chamber 30 contribute tremendously to the improvement of the combustion.

Figure 7:
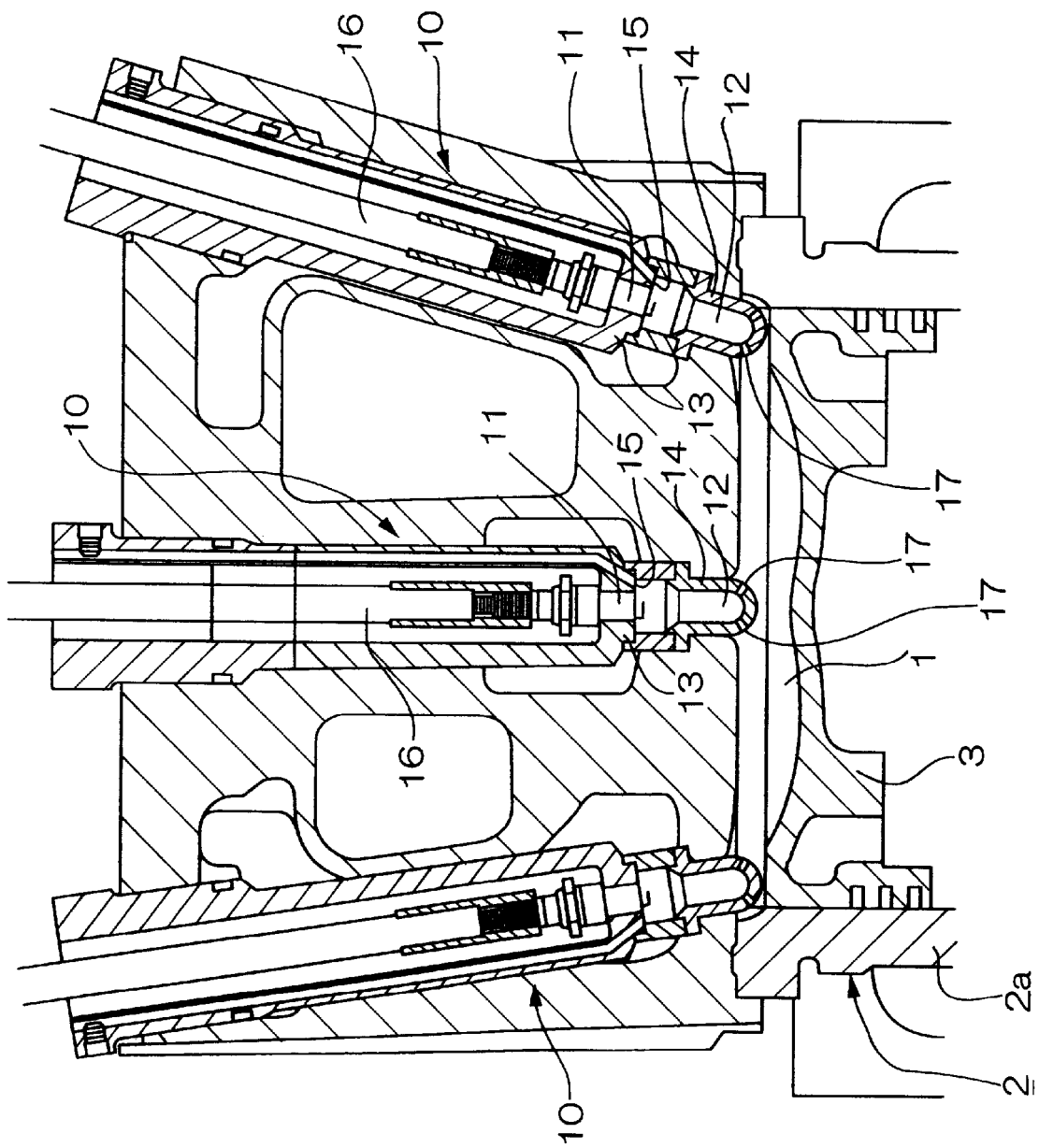
FIG. 7 is a diagram showing a cross-sectional side view of an example of the construction of the combined engine according to the present invention.
Figure 8:
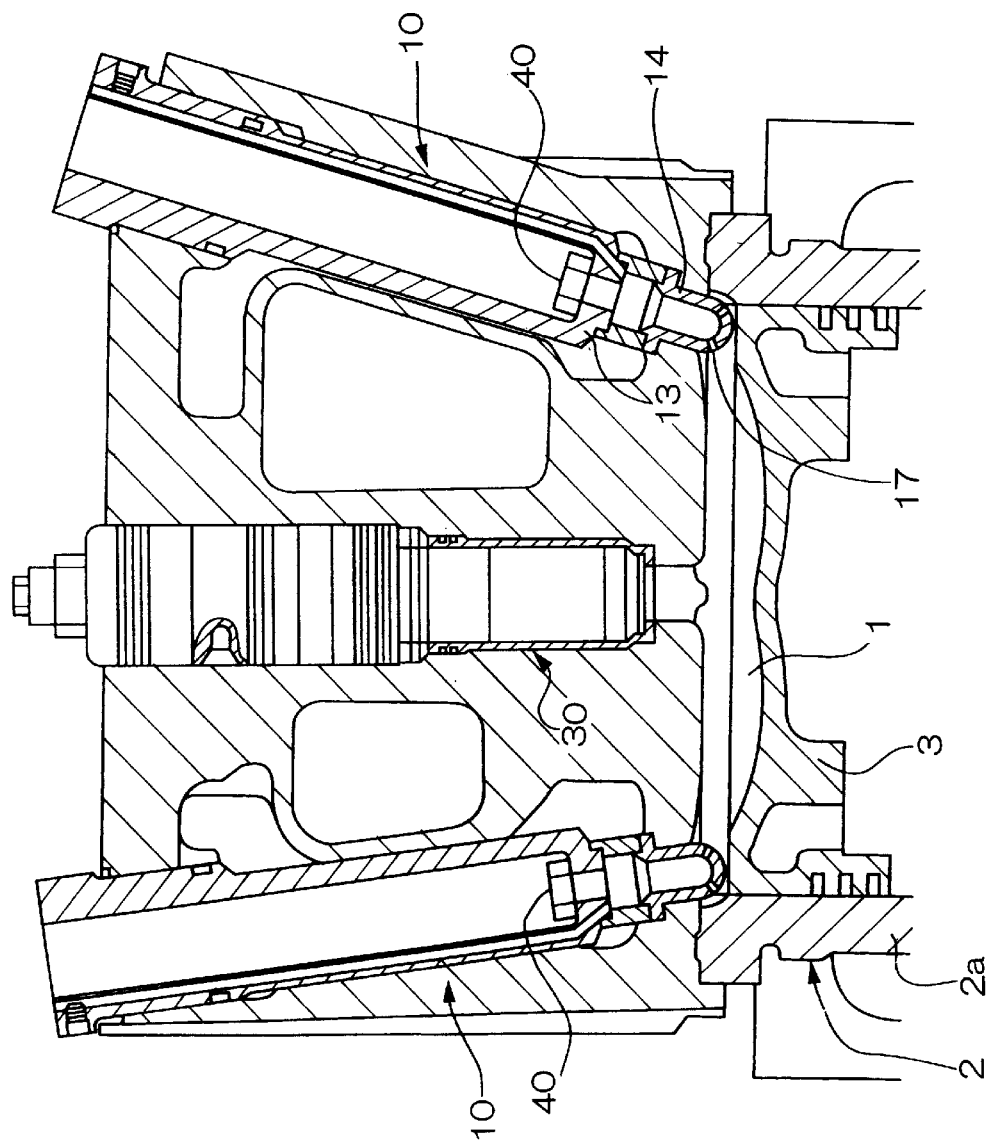
FIG. 8 is a diagram showing a cross-sectional side view of another example of the construction of the combined engine according to the present invention.

Furthermore, according to the combined engine of the present embodiment, as shown in FIG. 1, the centrally arranged liquid fuel injection valve 30 is installed from the exterior of the engine. However, it is also possible to remove this liquid fuel injection valve 30 and replace it with a spark plug-equipped precombustion chamber unit 10. FIG. 7 shows an example of such a replacement. However, according to this design, numbers and the direction of the connection ports 17 of the centrally positioned, spark plug-equipped precombustion chamber unit 10 differs from that of the connection ports 17 provided in the precombustion chambers 12 positioned at each side of thereof. This aspect is designed so that the jet flames ejected from the connection ports 17 of the centrally positioned, spark plug-equipped precombustion chamber unit 10 do not strike and interfere with the jet flames ejected from the connection ports 17, provided in the precombustion chambers 12 positioned at each side of thereof, which would lead to a loss of energy. In this manner, the ignition area is increased, which enables a shortening of the combustion period (duration), and an improvement of the thermal efficiency.

In addition, in the case when gas operation using spark-ignition will not be executed for a prolonged period, a plug 40 may be installed in place of the spark plug 11 (see FIG. 1) of the spark plug-equipped precombustion chamber unit 10, in order to seal the opening after removing the aforementioned spark plug.

In the following, the response when, for example, one of the spark plug-equipped precombustion chamber units 10 is lost as a function of the ignition source during operation as the aforementioned spark-ignition gas engine and/or hybrid ignition gas engine, will be described.

Figure 9:
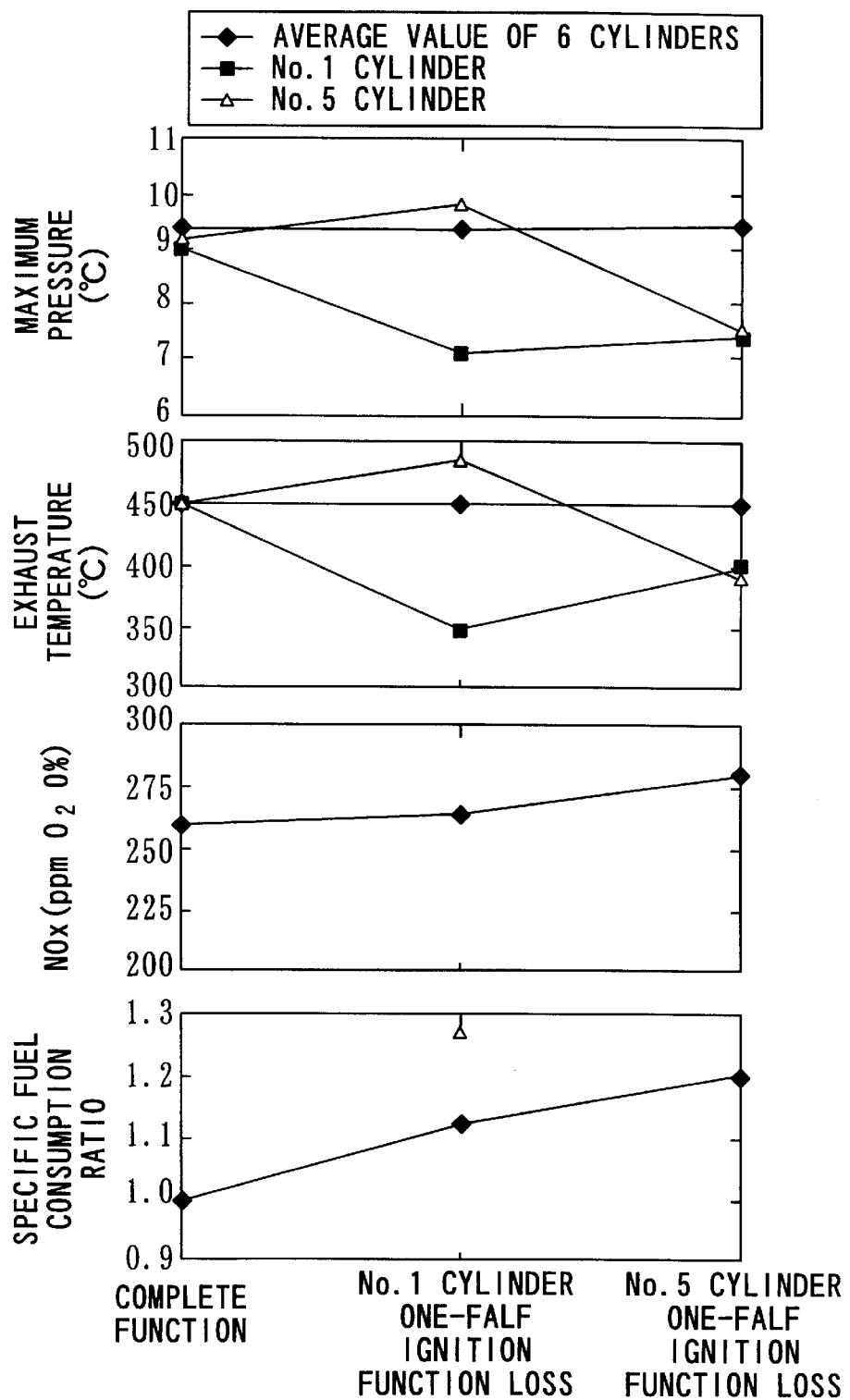
FIG. 9 is a diagram showing the performance changes during loss of one-half of the precombustion chambers in the combined engine according to the present invention.

When this state occurs, extreme exhaust temperature changes and maximum pressure changes occur due to reduction of the combustion efficiency of the fuel-air mixture within the main combustion chamber. FIG. 9 shows the specific fuel consumption ratio, NOx, exhaust temperature, and maximum pressure, respectively, in the case when (1) all cylinders are properly functioning, (2) one-half of the ignition function (firing) from the No. 1 cylinder has ceased, and (3) one-half of the respective ignition function from the No. 1 and No. 5 cylinders have simultaneously ceased. As seen from FIG. 9, when an abnormality of the ignition function occurs, extreme changes occur, particularly in the exhaust temperature, such that a response follows the change of the exhaust temperature.

Figure 10:
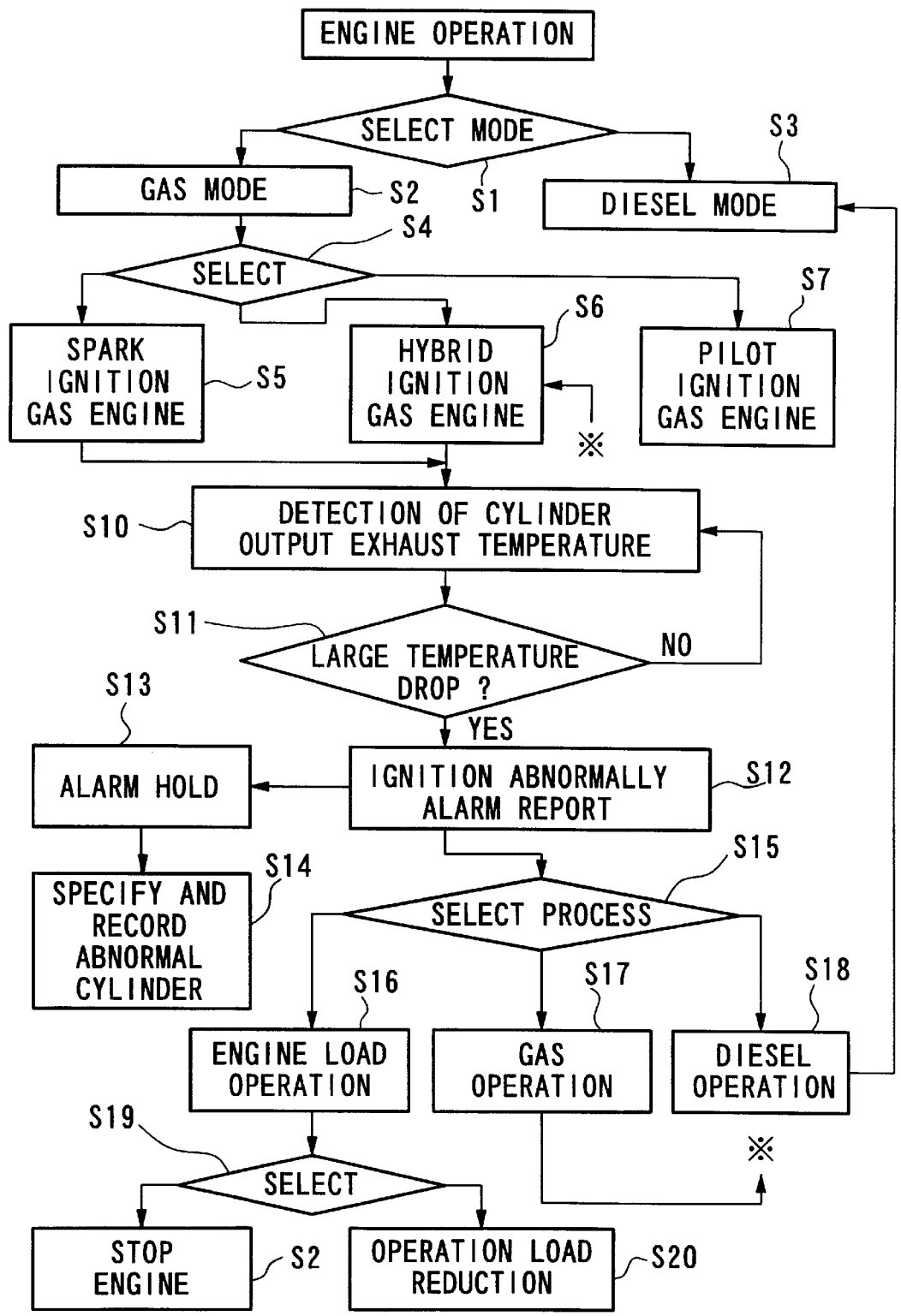
FIG. 10 is a flow diagram showing a sequential operation of the combined engine according to the present invention.

The flow of operations at this time is shown in FIG. 10.

When starting the operation of the engine, initially the operational mode is selected. The broad categories include selecting either a gas mode or diesel mode; within the gas mode, any one of the spark-ignition gas engine mode, hybrid ignition gas engine mode, or pilot injection gas engine mode may be selected (S1~S7). The corresponding operation is then performed based on the selected mode.

When conducting gas operation, the cylinder output exhaust temperature is monitored, and when a large drop in the temperature occurs, an ignition abnormality alarm is generated, with the abnormal cylinder being specified and stored while holding the alarm (S~S14). At the same time, the operation proceeds to the action selection step S15, and a selection is made between an engine load operation, gas operation, or diesel operation as a countermeasure (S16~S18). When an engine load operation is selected, a further selection is made between either reducing the operational load or stopping the engine (S19~S21). In addition, when a gas operation is selected, the process proceeds to step S6 of the hybrid ignition gas engine operational mode, and performs the corresponding operation. More concretely, when an ignition abnormality is detected, e.g., when the hybrid ignition gas engine is selected, either the pilot oil amount is increased to achieve a stable combustion, or alternatively, the process is switched to diesel operation as 100% liquid fuel. In this manner, it is possible to continue operation without reducing the engine output, efficiency, etc.

As described in the aforementioned, according to the engine of the present invention, it is possible to selectively conduct both spark-ignition and compression-ignition in the same engine, and as a result, instantly respond to either gas fuel or liquid fuel. Thus, it is possible to respond accordingly to the energy circumstances (e.g., fuel procurement capability) of a region, and also other circumstances, such as in the case when one type of fuel is not available for either a short or prolonged period of time. For example, it is possible to utilize the engine under normal circumstances as a gas engine generator (e.g., for use in co-generation) and as a diesel engine generator for supplying electrical power during emergencies such as a fire.

Consequently, according to the present invention, it is possible to achieve a combined engine which exhibits a low pollution when utilizing gas fuel, and a high thermal efficiency when utilizing liquid fuel, without requiring high manufacturing costs for the engine.

What is claimed is:

1. A method for operating a combined engine as a pilot injection gas engine, said combined engine receiving a drive output by means of supplying and combusting at least one fuel selected from among a gas fuel and a liquid fuel, said combined engine having a main combustion chamber which comprises a piston, a cylinder and a cylinder head; a precombustion chamber equipped with a spark plug which serves as an ignition source for a fuel-air mixture comprising air and said gas fuel within said main combustion chamber; and a liquid fuel injection valve for injecting liquid fuel into said main combustion chamber: wherein, said precombustion chamber and said liquid fuel injection valve are provided in said cylinder head, said method comprising:

supplying a fuel-air mixture comprising gas fuel and air to said main combustion chamber;

injecting a small amount of liquid fuel from said liquid fuel injection valve into said main combustion chamber;

compression-igniting said liquid fuel injected into said main combustion chamber; and combusting said fuel-air mixture within said main combustion chamber using said compression-ignited portion as an ignition source.

2. A method for operating a combined engine as a hybrid ignition gas engine that is capable of utilizing both gas fuel and liquid fuel, said combined engine receiving a drive output by means of supplying and combusting at least one fuel selected from among a gas fuel and a liquid fuel, said combined engine having a main combustion chamber which comprises a piston, a cylinder and a cylinder head; a precombustion chamber equipped with a spark plug which serves as an ignition source for a fuel-air mixture comprising air and said gas fuel within said main combustion chamber; and a liquid fuel injection valve for injecting liquid fuel into said main combustion chamber; wherein, said precombustion chamber and said liquid fuel injection valve are provided in said cylinder head, said method comprising:

in the same combustion cycle, supplying a fuel-air mixture comprising gas fuel and air to said main combustion chamber;

supplying a pilot gas to said spark plug-equipped precombustion chamber, and spark igniting said pilot gas by means of said spark plug;

injecting a small amount of liquid fuel from said liquid fuel injection valve and compression-igniting said liquid fuel at approximately the same timing, or alternatively before or after said spark ignition; and combusting said fuel-air mixture within said main combustion chamber using said spark-ignited and compression-ignited portions as an ignition source.

3. A method for operating a combined engine, said combined engine receiving a drive output by means of supplying and combusting at least one fuel selected from among a gas fuel and a liquid fuel, said combined engine having a main combustion chamber which comprises a piston, a cylinder and a cylinder head; a precombustion chamber equipped with a spark plug which serves as an ignition source for a fuel-air mixture comprising air and said gas fuel within said main combustion chamber; and a liquid fuel injection valve for injecting liquid fuel into said main combustion chamber; wherein, said precombustion chamber and said liquid fuel injection valve are provided in said cylinder head, said method comprising:

during times of normal operation, supplying a fuel-air mixture comprising gas fuel and air to said main combustion chamber;

supplying a pilot gas to said spark plug-equipped precombustion chamber, and spark igniting said pilot gas by means of said spark plug; and combusting said fuel-air mixture within said main combustion chamber using said spark plug-equipped precombustion chamber as an ignition source;

wherein, at the time when an ignition abnormality of said spark plug-equipped precombustion chamber is detected due to a change in the exhaust temperature, another operational process is performed which differs from that performed in an operational mode during times of normal operation.

4. A method for operating a combined engine as a hybrid ignition gas engine that is capable of utilizing both gas fuel and liquid fuel, said combined engine receiving a drive output by means of supplying and combusting at least one fuel selected from among a gas fuel and a liquid fuel, said combined engine having:

a main combustion chamber which comprises a piston, a cylinder and a cylinder head;

a precombustion chamber equipped with a spark plug which serves as an ignition source for a fuel-air mixture comprising air and said gas fuel within said main combustion chamber; and a liquid fuel injection valve for injecting liquid fuel into said main combustion chamber, said method comprising:

in the same combustion cycle, supplying a fuel-air mixture comprising gas fuel and air to said main combustion chamber;

supplying a pilot gas to said spark plug-equipped precombustion chamber, and spark igniting said pilot gas by means of said spark plug;

injecting a small amount of liquid fuel from said liquid fuel injection valve and compression-igniting said liquid fuel at approximately the same timing, or alternatively before or after said spark ignition; and combusting said fuel-air mixture within said main combustion chamber using said spark-ignited and compression-ignited portions as an ignition source.

5. A method for operating a combined engine, said combined engine receiving a drive output by means of supplying and combusting a least one fuel selected from among a gas fuel and a liquid fuel, said combined engine having:

a main combustion chamber which comprises a piston, a cylinder and a cylinder head; and a precombustion chamber equipped with a spark plug which serves as an ignition source for a fuel-air mixture comprising air and said gas fuel within said main combustion chamber, said method comprising:

during times of normal operation, supplying a fuel-air mixture comprising gas fuel and air to said main combustion chamber;

supplying a pilot gas to said spark plug-equipped precombustion chamber, and spark igniting said pilot gas by means of said spark plug; and combusting said fuel-air mixture within said main combustion chamber using said spark plug-equipped precombustion chamber as an ignition source;

wherein, at the time when an ignition abnormality of said spark plug-equipped precombustion chamber is detected due to a change in the exhaust temperature, another operational process is performed which differs from that performed in operational mode during times of normal operation.

* * * * *